J. D. HILLIARD.
PROCESS OF SMELTING METALS.
APPLICATION FILED NOV. 26, 1907.
1,080,344.
Patented Dec. 2, 1913.
6 SHEETS—SHEET 6.
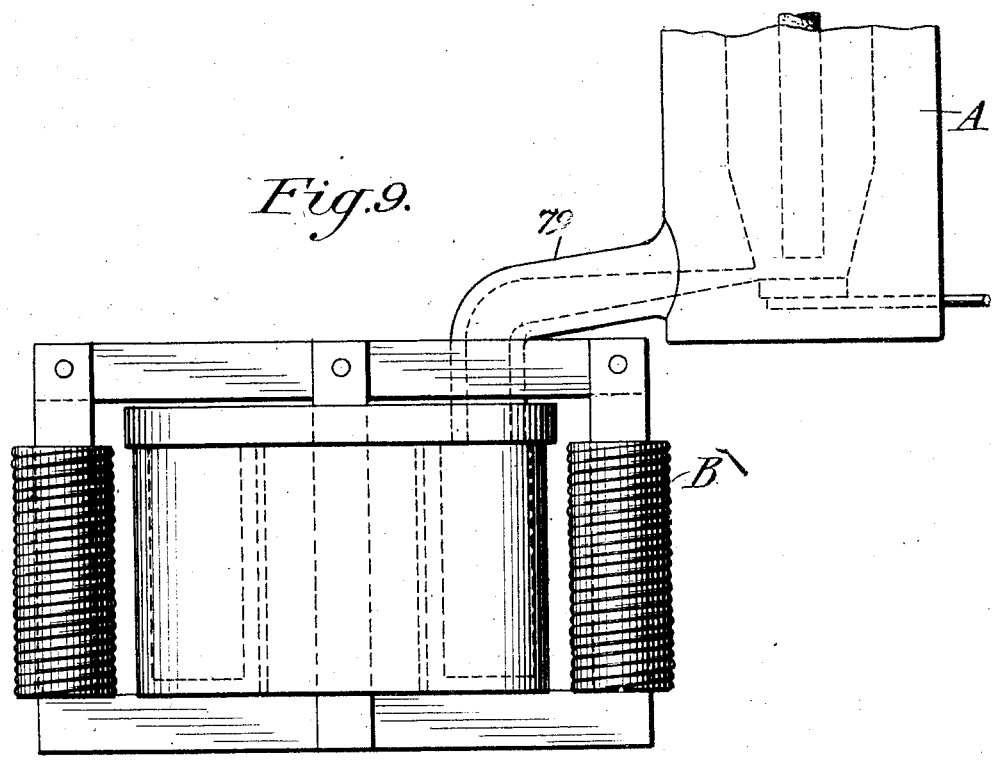
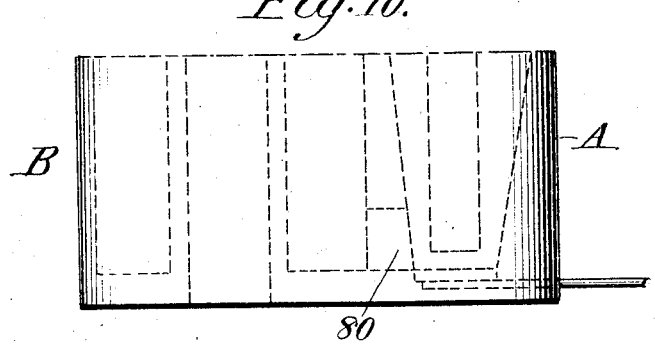
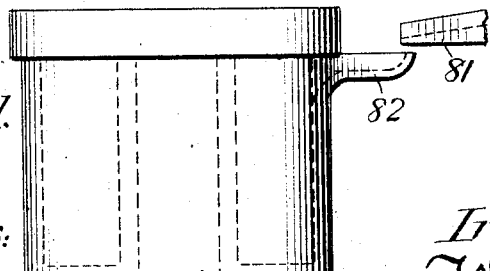
Witnesses:
Inventor:
John D. Hilliard
by Edward E. Clement
atty

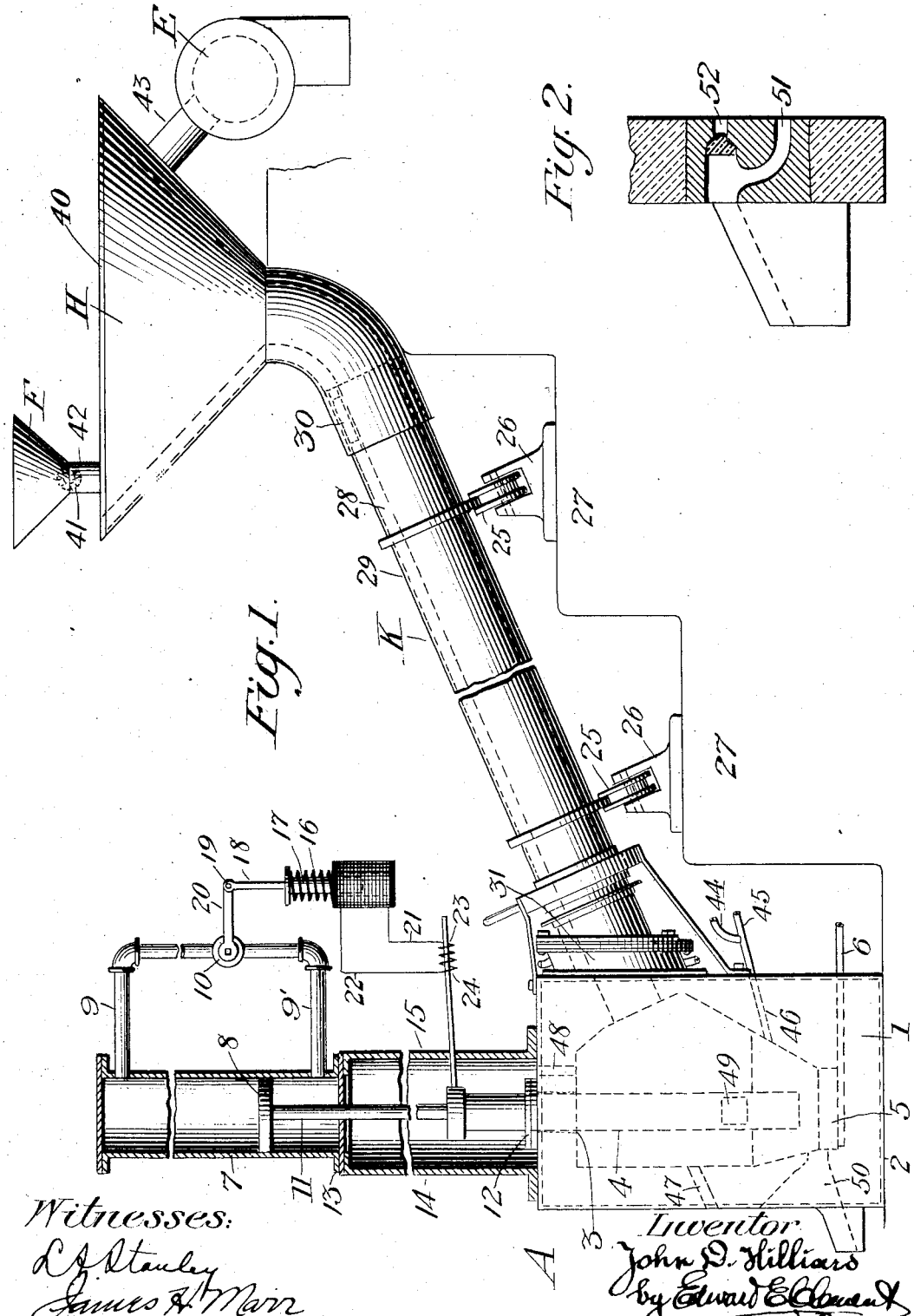

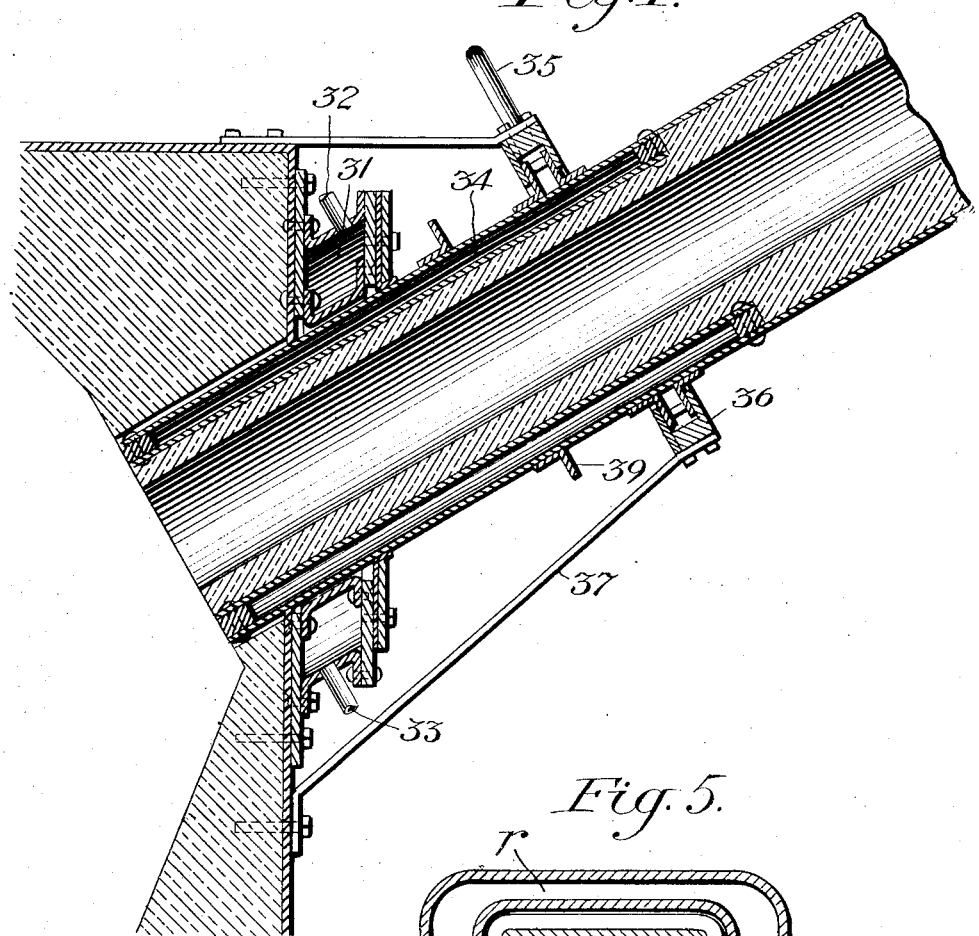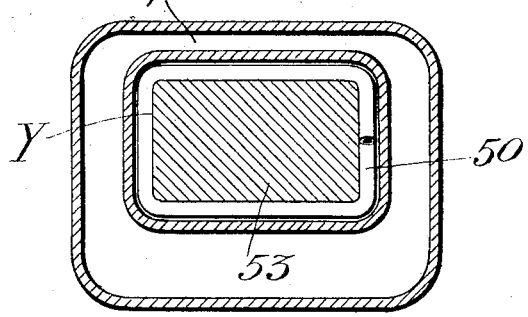

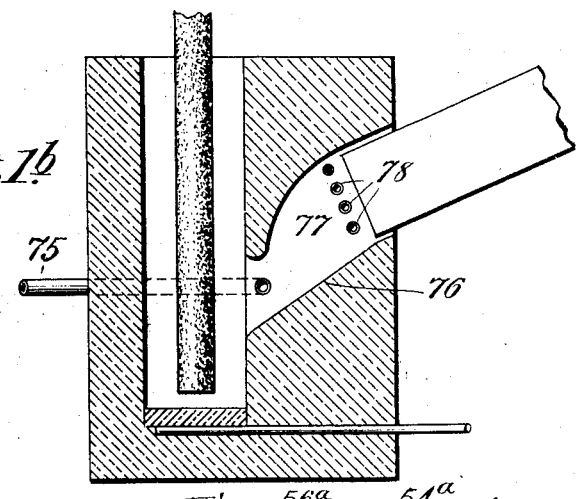
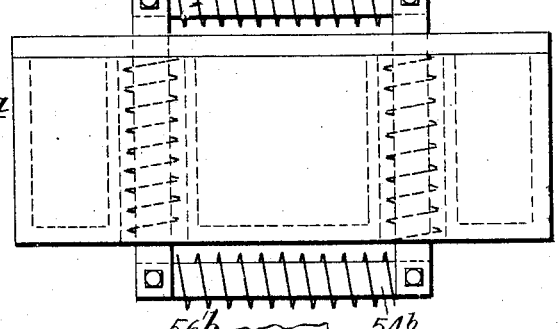
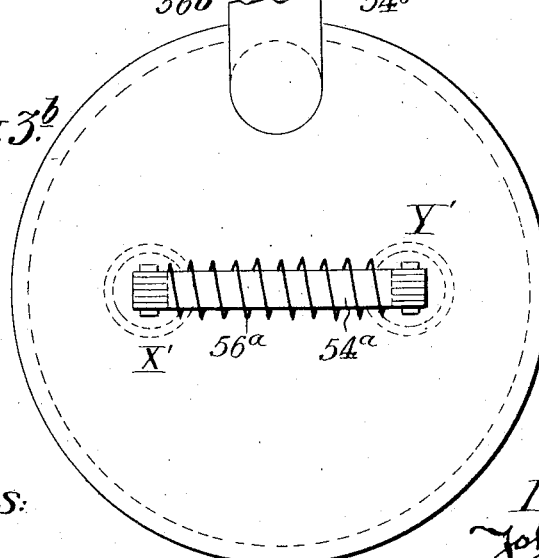

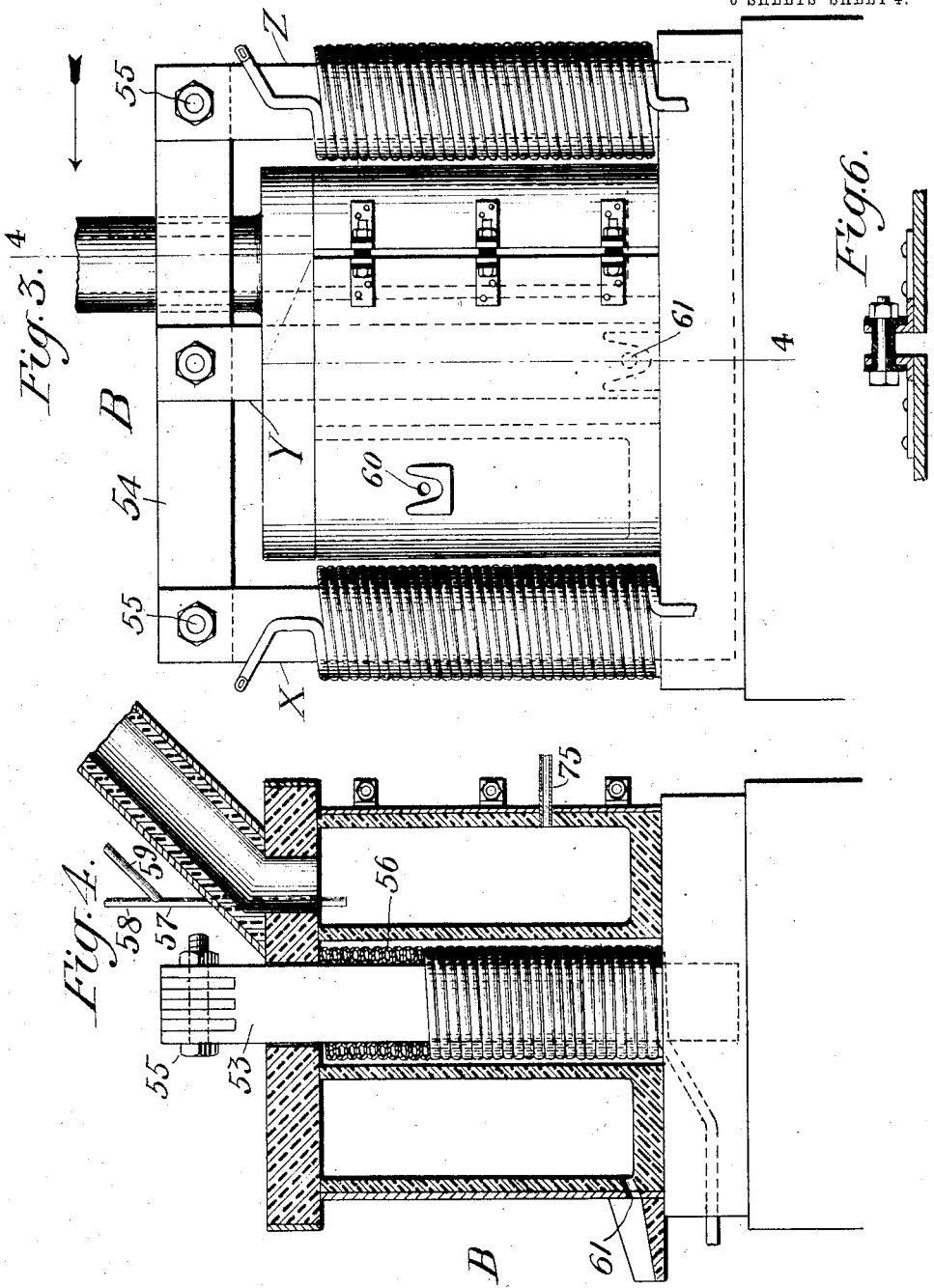

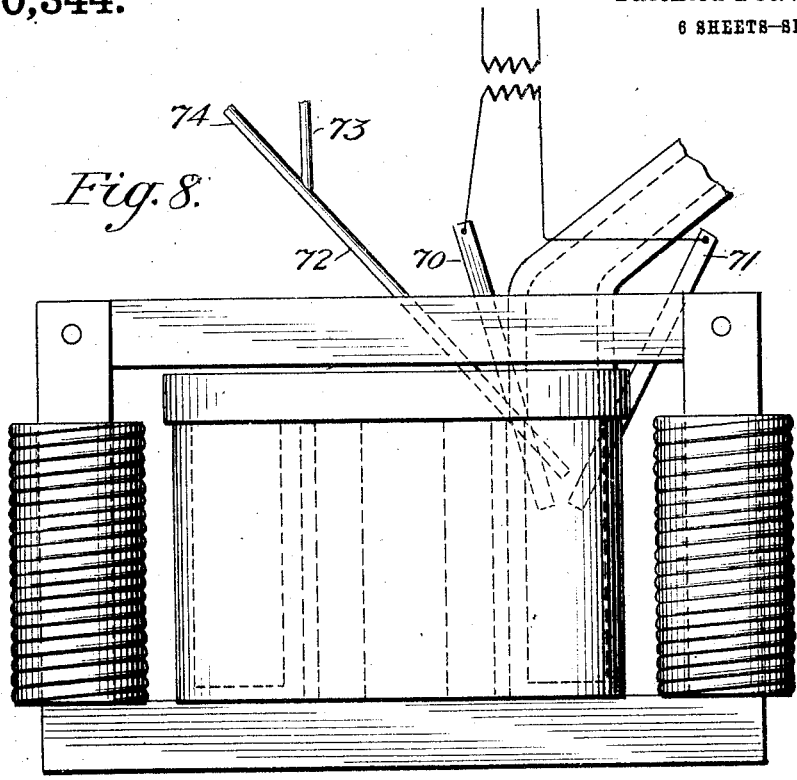
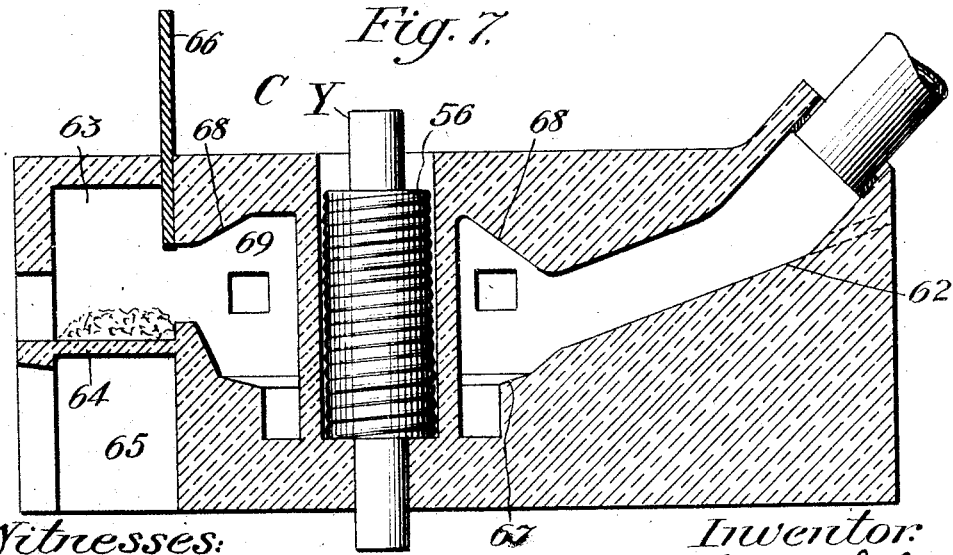

UNITED STATES PATENT OFFICE.

JOHN D. HILLIARD, OF ALBANY, NEW YORK, ASSIGNOR TO NEW ENGLAND METAL & MACHINE COMPANY, OF BOSTON, MASSACHUSETTS, A CORPORATION OF MASSACHUSETTS.

PROCESS OF SMELTING METALS.

1,080,344.  Specification of Letters Patent.  Patented Dec. 2, 1913.

Application filed November 26, 1907. Serial No. 403,925.

*To all whom it may concern:*

Be it known that I, JOHN D. HILLIARD, a citizen of the United States, residing at Albany, in the county of Albany and State of New York, have invented certain new and useful Improvements in Processes of Smelting Metals, of which the following is a specification, reference being had therein to the accompanying drawing.

My invention relates to metallurgical processes, and has for its object the improvement of such processes.

It relates particularly to the methods of producing and regulating heat in metallurgical furnaces.

The invention is applicable to several allied arts. Certain features render it particularly useful in the reduction of iron and similar ores, while other features render it applicable to and advantageous in the production of materials like calcium carbid, which require an intense and closely regulated heat.

Certain features of the invention are important because they render it possible to produce an even and intense heat without the accession of air or the introduction of any impurities, this being notably desirable in certain melting operations.

Broadly stated, my invention consists in the use in combination of electrical heating means of several types, and certain other heating means.

An important feature of the invention is to advance the heating of a charge by continuous increments; or in other words, before subjecting the material to the final heat of dissociation, to produce in an improved manner preheating of the mass which can thus be raised to the final temperature in less time and with a smaller expenditure of energy than has heretofore been possible.

Stated in terms of one embodiment, the invention calls for a continuously feeding and operating preheating kiln, in combination with one or more electric furnaces. It contemplates the feeding in of material in a finely divided state, the use of the gases produced during reduction, either directly as fuel or as heating agents, thus making possible the combination of all the available sources of heat, including the material itself, for the production of an intense and constant heat at the final point.

In order to accomplish the various purposes for which the invention is intended, the specific form of the electrical heating device to be employed in some processes differs from that for others. My invention may therefore be considered to include several forms of electric furnace, to wit: (A) An electric arc furnace working in conjunction with a preheating rotary or oscillating kiln. (B) An electric induction furnace combined with a rotary kiln. (C) An electric induction furnace for auxiliary heating, working in conjunction with a reverberatory furnace and a rotatable kiln. (D) An electric furnace consisting of a combined arc and induction furnace with auxiliary heating means. (E) An electric arc furnace with an auxiliary preheating means, such as a rotary kiln, and a supplementary heating means consisting of an electric induction furnace. It will be noted that in each of the above mentioned forms, the main principle of the invention is found in the combination of an electric furnace and an auxiliary preheating means. Additional forms, without preheating means, are: (F) An electric induction furnace in combination with a reverberatory furnace. (G) A combined electric arc and induction furnace.

My invention is illustrated in the accompanying drawings in which—

Figure 1 is a vertical sectional view of the electric arc furnace and the associated rotary kiln. Figs. 1ª and 1ᵇ are detail sectional views. Fig. 2 is an enlarged detail sectional view of a portion of the furnace including the tap holes. Fig. 3 is a side elevation of the induction furnace. Figs. 3ª and 3ᵇ show a modified form of the same. Fig. 4 is a sectional view of the induction furnace on the line 4—4 of Fig. 3, looking in the direction of the arrow. Fig. 5 is a view of a horizontal section showing the magnetizing coil and core and a crucible with a restricted section. Fig. 6 is a detail view showing the manner of insulating the metal jacket. Fig. 7 is a longitudinal sectional view of the reverberatory furnace, the auxiliary induction furnace, and a portion of the rotary kiln. Fig. 8 is a sectional view of a combined arc and induction furnace, and a portion of the rotary kiln. Fig. 9 is a sectional view of an electric arc furnace and a supplementary auxiliary induction furnace. Fig. 10 is a modified arrangement of the combined arc and induction furnace. Fig. 11 is a further modified arrangement of the combined arc and induction furnace.

Referring to Fig. 1, the electric arc furnace is denoted in general by A. It consists of an inclosed structure lined with highly refractory material 1, surrounded by a metal casing 2. The heating chamber converges toward the bottom in the ordinary manner and at its top is provided with an opening 3. Disposed in the opening 3 and arranged for longitudinal movement therethrough is an electrode 4 composed of carbon or other suitable material. A second electrode 5 at the bottom of the chamber is connected with a generator by means of a conductor 6. Disposed above the furnace chamber is a device designed to regulate the temperature of the furnace. It consists of a cylinder 7 in which a piston 8 is arranged for reciprocatory movement. At each end of the cylinder 7 are the inlet pipes 9 and 9′ leading to a common supply pipe 10, the latter being connected with the pipes 9 and 9′ by means of a three-way valve arranged to admit an operating fluid from the supply pipe 10 into one of the pipes 9 and 9′ and to provide an outlet for the other pipe. Secured to the piston 8 is a rod 11 to which the upper part of the electrode 4 is attached. A gasket 12, surrounds the electrode 4 and prevents the escape of gases from the interior of the furnace. The cylinder 7 is mounted upon a platform 13, supported on upright members 14 and 15, secured upon the top of the furnace. The regulating magnet is shown at 16 and is provided with a movable core 17, attached to a rod 18, pivoted at 19 to an arm 20 which is attached to the three-way valve and arranged to operate the latter in response to any movement of the core 17. The terminals of the regulating magnet 16 are connected by means of the conductors 21 and 22 to the terminals of the coil 23 through the center of which passes the conductor 24 leading to the electrode 4. The regulation of the temperature of the furnace is accomplished as follows: When the temperature of the furnace is increased the conductivity of the path through the carbon electrodes is also increased, thereby permitting a greater flow of current through the conductors 6 and 24. This increase of current flowing through the conductor 24 generates an induced current in the coil 23 thereby energizing the magnet 16 which draws in the core 17 and admits the operating fluid to the branch 9′. This fluid entering the lower part of the cylinder, causes the piston and the upper electrode to ascend, thereby increasing the resistance at the arc and cutting down the current. By winding the coil 23 with a definite number of turns the induced current can be made to operate the magnet at any desired temperature and to keep the heat of the furnace approximately constant. Communicating with the upper part of the electric furnace A is an inclined kiln K mounted for rotation or oscillation on the supporting rolls 25, the latter being pivoted on the standards 26 mounted on bases 27. The kiln K consists of a hollow cylinder having a refractory lining 28 and a surrounding casing 29. At the upper and lower ends of the kiln are water jackets marked 30 and 31 respectively. The lower water-jacket is supplied with water through the pipe 32. (Fig. 1ª), the outlet pipe being shown at 33. In order to further control the temperature of the lower part of the rotary kiln there is an additional water space 34 supplied by means of a pipe 35, which communicates with the water space through the medium of a stationary slip ring 36, the latter being held in position by the supports 37 and 38 attached to the furnace A. A drip ring 39 is disposed beneath the slip ring to prevent any drippings of the latter from reaching the furnace A. At the upper end of the inclined kiln K is a funnel shaped stationary gas holder H provided with a gas tight cover 40. A feed hopper F provided with a feed regulating device 41 communicates with the gas holder H by means of a pipe 42. It will be observed that the upper end of the kiln is expanded. This is for the purpose of decreasing the velocity of the gas at this point to permit the dust to settle instead of being carried off with the gas. For the purpose of carrying off the spent gases I have provided an exhaust fan E communicating with the gas holder H by means of the pipe 43. The rate of rotation of the kiln is designed to be under proper regulation as is also the feed of the hopper F. In order to have the heat of the furnace and the kiln under absolute control, I install pipes 44 and 45 to convey air and a carbonaceous material such as oil or powdered coal which may be blown in as a mixture through the opening 46 and consumed to raise the temperature of the furnace and the connected kiln. For watching the progress of the operations I have provided the peep holes 47 and 48 and the usual slag hole 49 and tap hole 50. It is sometimes desirable in operations such as the smelting of iron, that air be kept from entering the electric furnace, as it has a tendency to cool the furnace and to form an explosive mixture. For this purpose I use either separate tap holes, some straight and others curved, or a combined straight and curved tap hole as shown in Fig. 2. In this figure the lower curved tap hole 51 is ordinarily used for withdrawing the product, while the upper tap hole 52 is used for emergency purposes only. The operation of this form of my invention may be readily understood from the foregoing detailed description of the various parts. The ore, coke and necessary fluxes are first powdered and are fed to the hopper F, through the medium of which the charge is delivered to the rotary kiln. From thence it is fed gradually through the inclined cylinder, in the meanwhile being subjected to the heat from the electric furnace and the ascending gases. The rotary movement of the kiln serves to expose all parts of the ore to the heat in the cylinder, the charge in the meantime descending by gravity until it finally reaches the electric furnace. By gaging the speed of rotation and the feed of the charge to the kiln, one can exactly regulate the amount and temperature of the charge to be delivered to the electric furnace. For certain operations it is desirable that the kiln oscillate rather than rotate, as this has a tendency to heat up the body as a whole and in one mass, instead of overturning the entire material with the resulting product of dust. When the charge has been delivered to the electric furnace it is subjected to a higher temperature, which may be further increased, as heretofore stated, by the introduction of an auxiliary supply of coal, or oil, and air, the resulting products of the chemical action being carried up through the rotary kiln to preheat the charge as described. In the electric furnace the slag which rises to the top is withdrawn through a slag hole provided for that purpose and the resulting product is withdrawn through the tap hole.

While I have shown in detail an electric arc furnace of a particular form, it will be understood that the shape of the furnace will depend entirely upon the kind of smelting operation to be carried on, some furnaces having a chamber with vertical sides, others requiring a chamber with the sides more or less inclined.

The spent gases which are drawn from the gas holder H by the exhaust fan E, if of the combustible type, may be fed to boilers or engines to generate power, and in any event will be passed through steam boilers for the generation of steam before being allowed to escape to the atmosphere or being consumed. The speed of this exhaust is under control so that any desired suction can be obtained.

In certain operations, as will be explained hereafter, there is produced in the electric furnace a considerable quantity of carbon monoxid gas (CO). This gas may be utilized by providing the necessary oxygen for its combustion. The modified form of the furnace shown in Fig. 1$^b$ is arranged with a pipe 75 for the admission of hot air for supplying the necessary oxygen. In this form there is an inclined preheating hearth 76, upon which the charge from the rotary kiln is delivered. This hearth 76 forms the bottom of an auxiliary heating chamber 77 leading to the kiln. At a point where the end of the kiln enters this chamber a series of pipes 78 is provided for the admission of air and powdered coal which can be blown directly into the open end of the kiln. This increases the combustion and in certain processes materially adds to the effectiveness of the furnace. The presence or absence of the inclined hearth and the hot air pipe is determined by the nature of the material to be smelted. In every case the pipes for the admission of air and powdered coal are present and they can be used or not as desired.

Referring now to Figs. 3 and 4, I have shown therein an induction furnace to be used with the rotary kiln already described. This form of furnace may be used to advantage in certain smelting processes which have to be performed out of contact with the air. The furnace in general is designated at B. It consists of a transformer having three limbs X, Y and Z. Each of these limbs has a central core 53 secured to a common laminated connecting bar 54 by means of the pins 55. Surrounding the cores 53, and suitably insulated therefrom is a helical winding, preferably of flattened copper pipe 56, through which a stream of water may be circulated in order to keep down the temperature. The adjacent coils of the pipe are insulated from one another to prevent short circuiting. The crucible or smelting chamber proper is lined with refractory material and surrounds the central limb Y, as shown in Fig. 3. In certain constructions I prefer to have the limb Y set to one side of the chamber in order to provide a restricted channel $r$ in the crucible (see Fig. 5). A pipe 57 communicates with the interior chamber of the crucible or smelting chamber and is designed to admit coal or oil from a pipe 58 or air from a pipe 59 in case the smelting process should require the supplementary heating already described. In the operation of an induction furnace it is at times necessary to withdraw the old crucible and to replace it by a new one. To facilitate this operation I make the upper part of the magnetic circuit, i.e., the connecting bar 54, rotatable on the pins 55 of the two outside vertical limbs X and Z, the laminated bar being unbolted at the center and swung up on one of its ends when it is desirable to replace the crucible. Moreover I provide the crucible cover with a joint so that it may be swung to one side for the inspection of materials when required. The slag hole is shown at 60 and the tap hole at 61.

The method of operation of the induction furnace is as follows: The charge from the rotary kiln is fed into the crucible of the induction furnace in the manner already described, a current being meanwhile passed through the copper coils on the three limbs. The charge falls to the bottom of the crucible and constitutes the secondary circuit of a transformer, the primary circuit being the three conducting copper coils on the three limbs. As soon as the conducting mass constituting the charge completes the circuit on the bottom of the crucible or furnace, it acts as a short circuited secondary, producing a very heavy current in the molten mass and increasing its temperature.

For certain work it is desirable that a certain part of the furnace be at a greater temperature than the remainder; and I obtain this increase in temperature by constructing the furnace with a restricted section $r$ (Fig. 5), in which the cross section of the material is less and, therefore, the heat greater. Since in this furnace the heat is equal to $C^2R$ per unit of length, (C denoting the current flow and R the resistance) the cross section being less, the resistance per unit of length is greater, and with a necessarily constant current in the one turn the heat in the restricted section is considerably greater than in the remainder of the furnace.

The furnace and attached parts should be made gas tight so there can be no admission of air to cause explosion or entrance of nitrogen to dilute the gas. With this furnace, culm, a material which has hitherto been worthless, is satisfactorily used to supply the carbon, so that I have provided a device which not only economically extracts the metal from the ore but which uses the cheapest possible fuel in doing so and produces a gas high in heat units which should have a large commercial value for heating purposes. I consider the saving of the gases that are ordinarily wasted and their use for heating or illuminating purposes, one of the important objects of my invention. If gas thus produced is to be sold, it is passed from the kiln through the usual condenser, scrubber and purifier and thence to a gas holder. While the furnace should be tightly sealed, it is desirable and I so construct it, that portions may be easily blown off and as readily replaced in order to provide for any explosion that may occur.

It will be understood that in operations requiring increased heat units the carbon monoxid gas generated in the induction furnace may be used for this purpose by supplying the necessary oxygen through the hot air pipe 75 and by the blowing in of powdered coal and air through the pipes 58 and 59 in the manner already described in connection with the arc furnace.

In Figs. 3ᵃ and 3ᵇ I have shown a modified form of the induction furnace in which the magnetic circuit is disposed so as to be particularly efficient. In this form there are two limbs X', Y' connected at the top and the bottom by the magnetic bars 54ᵃ and 54ᵇ, respectively. On the bars 54ᵃ and 54ᵇ are the separate windings 56ᵃ and 56ᵇ. This forms a closed magnetic circuit with both the limbs X' and Y' projecting through the crucible. Such an arrangement produces two currents flowing in two separate circuits. The middle section of the furnace can here be covered up and at the same time free access can be had to the interior without removing the upper part of the magnetic circuit.

In Fig. 7 I have shown a reverberatory furnace combined with induction auxiliary and preheating means. The furnace is denoted in general by C. It consists of an elongated structure having at one end an inclined preheating hearth 62, in communication with the open end of a rotary kiln of a kind similar to that already described. The opposite end of the structure is arranged for supplying auxiliary heat from the combustion of fuel and includes the combustion chamber 63, the grate 64 and ash-pit 65. A shutter 66 is disposed at the inner end of the combustion chamber and is designed to regulate and to direct the heat from the burning fuel. Between the preheating hearth and the auxiliary combustion furnace there is disposed an induction furnace. It is provided with three vertical limbs, X, Y, Z, surrounded by their magnetizing coils 56, as described heretofore. The main hearth 67 is an annular combined induction and externally fired hearth. The furnace is provided with the usual arch-shaped roof 68, commonly used in reverberatory furnaces. It will be understood of course that the form of the heating chamber 69 will depend largely upon the character of the charge to be smelted and that while the figure shows a particular form, it is so shown merely for purposes of illustration. As in operations of the furnaces already described, the charge is heated first in the rotary kiln, and then falls upon the preheating hearth 62 where it is subjected to a greater heat preparatory to a final heating on the hearth 67.

The ordinary form of apparatus in use in the production of steel by the open hearth process, (that is, in the reverberatory furnace) is extremely wasteful of heat. When the new charge of scrap is placed in the furnace there is a rapid absorption of heat by the charge, but as the temperature of the charge approaches the temperature of the hot gas, and the limit of the temperature obtained in the ordinary furnace, this absorption becomes slower and slower, and the amount of heat thrown away greater and greater, so that the time required to raise the charge the last few hundred degrees is very great and the expense comparatively high. By combining the reverberatory furnace with the induction furnace and utilizing this heat energy to generate steam which may be used in the induction furnace in the manner already described, the time of melting is greatly reduced, as is also the cost and, moreover, the final operation is held under perfect control. The quality of the product of this furnace is very much better since the oxidizing gas may be absolutely excluded from the furnace during the final moments of operation. In the ordinary work, and preferably in all work, it is necessary to make use of the pyrometer, and accordingly provision is made for its use in the furnaces where it is required.

In Fig. 8 I have shown my invention as applied to a combined arc and induction furnace with the usual preheating means. In this form the carbon electrodes 70 and 71 extend from the top of the furnace downwardly into the interior of the crucible, being separated to provide an arc of sufficient resistance to maintain the right temperature. The pipe 72 with the branches 73 and 74 for oil or coal, and air, respectively, also terminates in the crucible in the vicinity of the arc. A regulating device, similar to the one already described in connection with Fig. 1, may be employed to regulate the arc.

There are many advantages in my combination of the arc and induction furnace, among which the following are distinctive and of great importance: first—the ability to establish and maintain the temperature of the furnace at any desired point until all the necessary chemical reactions have taken place. These reactions are carried on without the possibility of contact with any impurities introduced from the outside and one is therefore absolutely certain of the results. Second—certain valuable by-products may be saved which are usually wasted in the ordinary furnace.

In processes requiring an admixture of limestone with the ore, the carbon dioxid given off from the heated limestone, would be mixed with the carbon monoxid and set free by the electric furnace. This is not desirable and may be avoided by forming the rotary kiln in two sections and providing a chamber therebetween from which the gas to be used for fuel, i. e., the carbon monoxid and any other combustible gases may be led directly to the burners.

In Figs. 9 to 11 inclusive, I have shown an arrangement in which there is first a preliminary heating in the rotary kiln, a second heating in the arc furnace and a supplementary and final heating in the induction furnace. In Fig. 9 the arc furnace is shown as elevated above the induction furnace but connected directly therewith by means of a pipe 79. In Fig. 10 I have shown a modified form in which the arc furnace is placed side by side with the induction furnace, the passage-way 80 being provided for the purpose of introducing the charge from the former into the latter. Fig. 11 shows an electric arc furnace elevated above the induction furnace and separate therefrom. The outlet 81 of the arc furnace, a portion of which is shown in the figure, terminates immediately above a cup-shaped receiver 82 on the induction furnace communicating with the interior of the latter.

The advantage arising from the use of the two furnaces as shown in Figs. 9 to 11, inclusive, is that the temperature employed at certain stages of the various operations can be more accurately adjusted to meet the requirements. Moreover, it may be desirable at some stages to admit air and at others to exclude it. Thus in the form of furnace shown in Fig. 9 the charge in the upper arc furnace A may receive a heating to a certain temperature and may be subjected to a supplementary heating of another temperature under different conditions.

Having thus described my invention, what I claim and desire to secure by Letters Patent of the United States is:

1. The process of producing a purified metal which consists in the following steps: (1) mixing the necessary material directly at normal temperature; (2) feeding the mixture continuously directly into a constantly traveling body of heated gases; (3) maintaining a regular, continuous and retarded advance of the mixture for a considerable distance through and in opposite direction to the flow of heated gases, so as to progressively absorb heat therefrom; (4) continuously agitating the material throughout its entire path of travel so as to expose every portion thereof to the action of the gases; (5) passing the mixture in its final heated condition due to the action of the gases into an enlarged generating and reducing chamber, without interrupting or retarding the generation or flow of gases therefrom into the preheating space or kiln; and (6) raising the temperature of the heated mixture so as to effect complete reduction, by means of electrical energy continuously conducted therethrough, while maintaining constant, free and unimpaired flow of the gases therefrom over the incoming stream of material throughout its entire path of travel, to the point of introduction.

2. The process of producing a purified metal which consists in the following steps: (1) mixing the necessary material directly at normal temperature; (2) feeding the mixture continuously directly into a constantly traveling body of heated gases; (3) maintaining a regular, continuous and somewhat slow advance of the mixture for a considerable distance through and in opposite direction to the flow of heated gases, so as to progressively absorb heat therefrom; (4) continuously agitating the material throughout its entire path of travel so as to expose every portion thereof to the action of the gases; (5) passing the mixture in its final heated condition due to the action of the gases into an enlarged generating and reducing chamber, without interrupting or retarding the generation or flow of gases therefrom into the preheating space or kiln; (6) raising the temperature of the heated mixture so as to effect complete reduction, by means of electrical energy continuously conducted therethrough, while maintaining constant, free and unimpaired flow of the gases therefrom over the incoming stream of material throughout its entire path of travel, to the point of introduction; and (7) expanding the gases so as to retard their flow at said point of introduction of the mixture, and free the same from dust and impurities.

3. The process of producing a purified metal which consists in the following steps: (1) mixing the necessary material directly at normal temperature; (2) feeding the mixture continuously directly into a constantly traveling body of heated gases; (3) maintaining a regular, continuous and retarded advance of the mixture for a considerable distance through and in opposite direction to the flow of heated gases, so as to progressively absorb heat therefrom; (4) continuously agitating the material throughout its entire path of travel so as to expose every portion thereof to the action of the gases; (5) passing the mixture in its final heated condition due to the action of the gases into an enlarged generating and reducing chamber, without interrupting or retarding the generation or flow of gases therefrom into the preheating space or kiln; (6) raising the temperature of the heated mixture so as to effect complete reduction, by means of electrical energy continuously conducted therethrough, while maintaining constant, free and unimpaired flow of the gases thereform over the incoming stream of material throughout its entire path of travel, to the point of introduction; (7) expanding the gases so as to retard their flow at said point of introduction of the mixture, and free the same from dust and impurities; and (8) drawing off the gases and products of combustion when thus retarded and purified; the entire process of passing the mixture from its point of introduction to the point of final reduction, and the reverse travel of the gases from the point of generation to the final point of discharge, being conducted in continuously communicating preheating and heating chambers closed against the ingress of air.

4. The process of producing a metal which consists in pre-mixing a subdivided mass of the material to be reduced and the reducing material, introducing the mixture at one end of a greatly elongated gas-tight inclosure, passing the same in interrupted or agitated progression through said inclosure, collecting the heating material at the end and further heating it to the required temperature of reduction by means of electric energy, causing the gaseous products of the last reaction to pass back freely and uninterruptedly through the inclosure over and in contact with the incoming stream of material to the point of introduction thereof, burning the same over the material whereby the latter will receive progressive increments of heat in an increasing ratio during its entire travel, and separating and removing the metal and the slag so as to maintain the continuity of the process.

5. The process of producing a metal which consists in pre-mixing the metallic material to be reduced and the reducing material in a subdivided mass, continuously feeding said mass of material containing the metal into one end of an elongated hot oven or kiln, passing the same continuously therethrough, gently agitating the material continuously during its travel, collecting the material at the end of the travel and heating to the required temperature by means of electric current induced in the smelting body through the walls of a gas-tight inclosure openly and freely communicating with the kiln or oven, causing the excess heat from the said current to be communicated to the combustible gases due to the reaction, causing said gases to pass backwardly over the traveling stream of material throughout its entire extent to the point of introduction and to be burned during the passage, whereby the material will be preheated by receiving progressive increments of thermal energy in an increasing ratio as it travels, maintaining the charge continuously, and removing the slag and molten metal.

6. The process of producing a metal which consists in mixing subdivided metallic ore, fluxing material and anthracite culm at normal temperatures, feeding the same into a hot oven or kiln, passing the same in a continuous attenuated stream through said oven or kiln, collecting the heated material in a furnace chamber communicating gastight with said oven or kiln, further heating to the desired temperature by means of electrical energy and finally passing the heated gases resulting therefrom backward over the incoming stream or charge, so as to raise the temperature thereof by progressive increments in a regularly increasing ratio through its entire travel.

7. The process of smelting and the production of metallic iron, cement slag and combustible gas, which consists in mixing subdivided oxid of iron, limestone or lime, clay, silica and carbon in due proportions at normal temperatures, feeding the same when mixed into a hot oven or kiln, passing the subdivided mixture through said oven or kiln, imparting to the stream continuous motion supplementary to its forward travel, collecting the material at the end of its travel in an inclosure in gas-tight communication with the kiln, heating the mass therein by means of electrical energy to the required temperature of reduction, causing the hot gases to pass backward through the kiln over the incoming mixed stream to raise the temperature thereof by progressive increments in increasing ratio during its travel, drawing off the residue of the gases after passing through the kiln, and separating and removing the slag and iron at the end of the operation so as to render the latter continuous.

8. A process for continuously smelting metal, wherein a charge is mixed at a normal low temperature, fed continuously through an extended path of travel to a reduction point, heated thereat to the necessary temperature of reduction, and the heated products thereof caused to act continuously in reverse order upon the advancing charge so as to raise the temperature thereof in a uniform but progressive ratio throughout its entire path of travel from beginning to end.

9. A process for continuously smelting metal, wherein a charge is mixed at normal temperatures, fed through an extended path of travel to a reduction point, passed into a crucible thereat, continuously heated in the crucible by electrical means to effect complete reduction, preheated in successive increments from the beginning to the end of its introductory travel by the products of combustion from the crucible passing over and through it, and superheated as a preliminary to complete reduction at the point of its passage into the crucible, by intense combustion due to jets of oil or coal-dust or the like with an oxidizing agent.

In testimony whereof I affix my signature in presence of two witnesses.

J. D. HILLIARD.

Witnesses:
 H. J. HUNNSICKER,
 M. L. STEVER.

---

Copies of this patent may be obtained for five cents each, by addressing the "Commissioner of Patents, Washington, D. C."